United States Patent
Palshikar et al.

(10) Patent No.: US 11,093,219 B2
(45) Date of Patent: Aug. 17, 2021

(54) SYSTEM FOR CO-ORDINATION OF LOGICAL SEQUENCE OF INSTRUCTIONS ACROSS ELECTRONIC DEVICES USING VISUAL PROGRAMMING AND WIRELESS COMMUNICATION

(71) Applicant: GUNAKAR PRIVATE LIMITED, Pune (IN)

(72) Inventors: Amol Subhash Palshikar, Pune (IN); Girish Ramesh Mujumdar, Pune (IN)

(73) Assignee: GUNAKAR PRIVATE LIMITED, Pune (IN)

( * ) Notice: Subject to any disclaimer, the term of this patent is extended or adjusted under 35 U.S.C. 154(b) by 0 days.

(21) Appl. No.: 16/337,523

(22) PCT Filed: Sep. 28, 2017

(86) PCT No.: PCT/IN2017/050435
§ 371 (c)(1),
(2) Date: Mar. 28, 2019

(87) PCT Pub. No.: WO2018/061030
PCT Pub. Date: Apr. 5, 2018

(65) Prior Publication Data
US 2019/0227776 A1    Jul. 25, 2019

(30) Foreign Application Priority Data
Oct. 1, 2016   (IN) .............................. 201621033630

(51) Int. Cl.
G06F 8/34   (2018.01)
G06F 9/445   (2018.01)
(Continued)

(52) U.S. Cl.
CPC .............. *G06F 8/34* (2013.01); *G06F 3/0486* (2013.01); *G06F 8/433* (2013.01); *G06F 9/445* (2013.01); *G06F 9/542* (2013.01); *H04W 4/026* (2013.01)

(58) Field of Classification Search
CPC .......... G06F 8/34; G06F 3/0486; G06F 8/433; G06F 9/445; G06F 9/542; H04W 4/025
See application file for complete search history.

(56) References Cited

U.S. PATENT DOCUMENTS 8,613,070 B1   12/2013   Borzycki et al.
9,412,071 B2   8/2016    Burris et al.
(Continued)

FOREIGN PATENT DOCUMENTS

ES   2349099 A1   12/2010

OTHER PUBLICATIONS

International Searching Authority, International Search Report, dated Jan. 16, 2018.
(Continued)

*Primary Examiner* — Wei Y Zhen
*Assistant Examiner* — Amir Soltanzadeh
(74) *Attorney, Agent, or Firm* — Kirton McConkie; Brian Tucker

(57) ABSTRACT

An orchestration engine provides a technical output across multiple programmable objects such as electronic devices, virtual objects and cloud based services in response to user specified logic. The orchestration engine may be deployed on a mobile computer, a tablet computer, a laptop computer, a desktop computer, a wired or wireless electronic device in the system or on a server computer connected via internet. The orchestration engine is capable of supporting extensibility in order to expand support for similar common interaction methods to newer electronic devices via a plug-in
(Continued)

framework by specifying the communication protocol of the new element and its capabilities in a descriptive way via a markup language. The orchestration engine is provided along with a library of drag and drop Visual Programming Language steps required for providing executable computer program steps for specifying a user specified logic by computer language illiterate person.

9 Claims, 1 Drawing Sheet

(51) Int. Cl.
  *G06F 3/0486* (2013.01)
  *G06F 8/41* (2018.01)
  *G06F 9/54* (2006.01)
  *H04W 4/02* (2018.01)

(56) References Cited

U.S. PATENT DOCUMENTS

| | | | | |
|---|---|---|---|---|
| 2008/0127044 A1* | 5/2008 | Barros | ............... | G06Q 10/06 717/104 |
| 2011/0257956 A1* | 10/2011 | Goel | ............ | H02J 13/00001 703/18 |
| 2014/0351800 A1 | 11/2014 | Jao et al. | | |
| 2014/0359552 A1* | 12/2014 | Misra | ..................... | G06F 8/60 717/100 |
| 2015/0067403 A1* | 3/2015 | Naseh | ............... | G06F 11/1438 714/37 |
| 2016/0078236 A1 | 3/2016 | Chesla | | |
| 2016/0119379 A1 | 4/2016 | Nadkarni | | |
| 2016/0012725 A1 | 5/2016 | Lee | | |
| 2016/0259534 A1* | 9/2016 | Simons | ............ | G06F 3/04842 |
| 2016/0357523 A1* | 12/2016 | Zhang | ..................... | G06F 8/34 |
| 2017/0093593 A1* | 3/2017 | Yang | ............... | H04L 12/2818 |
| 2018/0336228 A1* | 11/2018 | Krog Iverson | ..... | G06F 16/9017 |
| 2019/0042227 A1* | 2/2019 | Sharma | ............... | G06K 9/0063 |

OTHER PUBLICATIONS

International Searching Authority, Written Opinion, dated Jan. 16, 2018.
Assistant Controller of Patents and Designs, Section 15, Feb. 22, 2019.
Intellectual Property India, Examination Report Under Sections 12 & 13 of the Patents Act, dated Apr. 20, 2018.
Intellectual Property India, Hearing Notice in Reference of Application No. 201621033630, Dec. 3, 2018.
European Patent Office, European Search Report, dated Jun. 2, 2020.

* cited by examiner

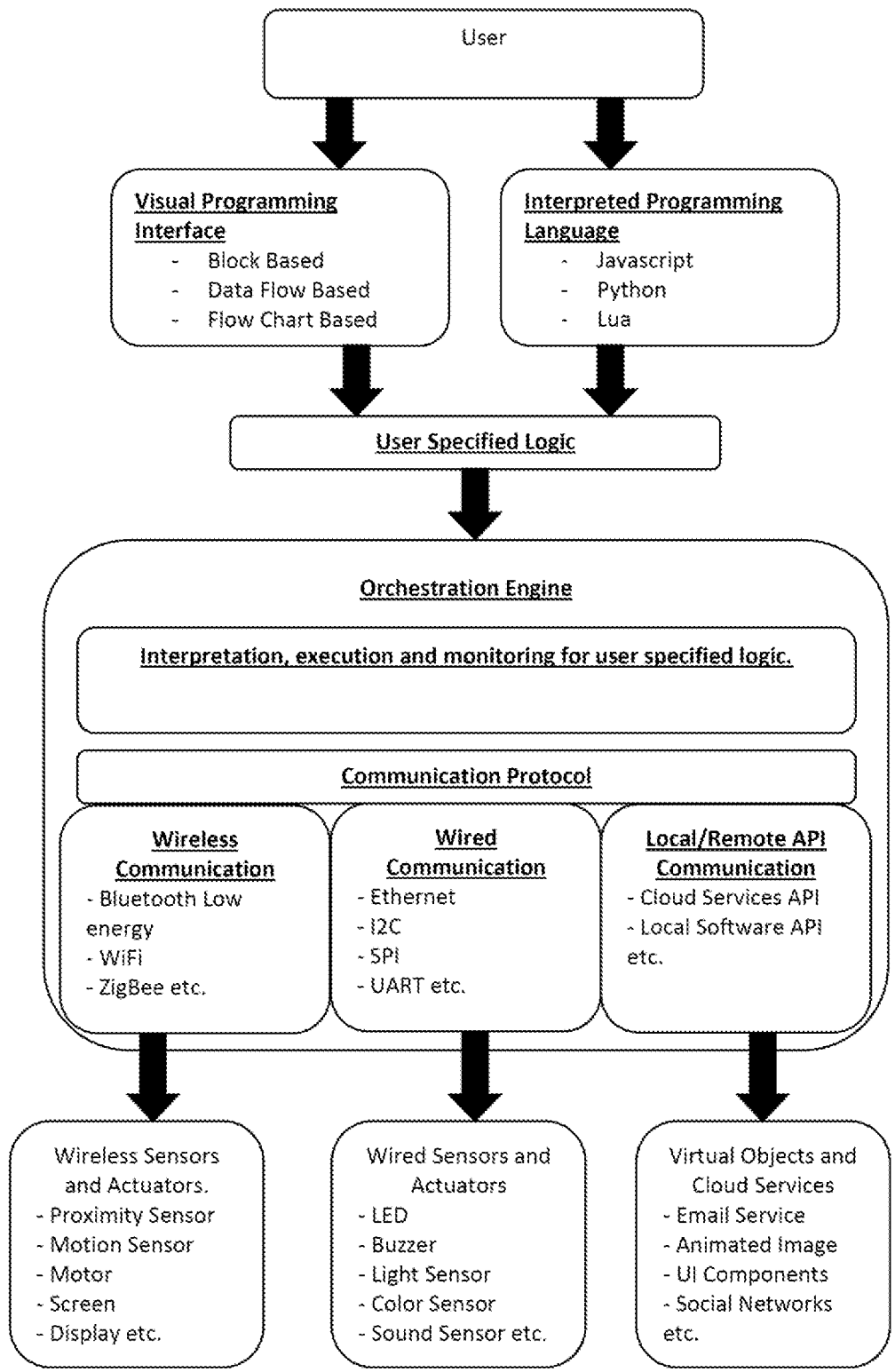

US 11,093,219 B2

SYSTEM FOR CO-ORDINATION OF LOGICAL SEQUENCE OF INSTRUCTIONS ACROSS ELECTRONIC DEVICES USING VISUAL PROGRAMMING AND WIRELESS COMMUNICATION

FIELD OF INVENTION

This invention pertains to computer related inventions. More particularly it relates to an Orchestration engine providing a technical output. Still more particularly, this invention pertains to an Orchestration engine that orchestrates providing a technical output on a user specified logic across two or more than two programmable objects selected from the group consisting of electronic devices, virtual objects and cloud services. Still more specifically, the Orchestration Engine can be used by a computer language illiterate user.

BACKGROUND OF THE INVENTION

Building technology enabled experiments and prototypes involve a combination of electronic devices (e.g. sensors, actuators), cloud based services, user interface and communication between all these components. This requires knowledge and skills in the fields of electronics, circuit design, computer programming, networking and communication technologies. These diverse set of skills and the complexity involved requires a team of individuals with relevant skills along with significant amount of time and resources. It is desirable that the efficiency of the process of building technology enabled experiments and prototypes be improved to require minimal amount of skills, time and resources. This objective is not achievable by currently known computer program products, systems and methods in Information Technology. The object of this invention is to overcome this inability.

Additionally, objective of this invention is also to enable computer programming language illiterate person to create technology enabled experiments and prototypes without requiring any training in constructing computer readable programs, circuit design and networking protocols.

U.S. Pat. No. 9,465,588 has disclosed a user programmable toy system configured for programming a toy comprising; a microcontroller; a computer memory configured for storing digital data provided by a software for controlling and executing by said microcontroller; at least one transducer to provide a response according to a signal provided by said microcontroller; at least one sensor for seeding a signal to said microcontroller; an improved Easy Format software enabling said user to compose a user program for directing said microcontroller to provide a response when a signal is received from said sensor and to energize said transducer according to the program flow of said user program; wherein said improved Easy Format software comprises additional features of an Easy Format software, which includes the steps of: (a) defining m input channels for said controller unit to receive external data or signals, wherein m is an integer equal or greater than one; (b) defining n output channels for said controller to transmit data or signals, wherein n is an integer equal or greater than one; (c) specify x configuration state, wherein each configuration state defines the configuration of at least one input channel and/or one output channel and x is an integer equal or greater than one; (d) specify y events to be executed by said controller unit, wherein y is an integer equal or greater than one; (e) specify an event to be executed when the signal or data received by an input channel satisfied a predefined qualifying condition and (f) enable an event to switch from a current configuration state to another configuration state; said Easy Format software further comprises at least one of the following steps or characteristics: (g) a step to specify at least one of the events to comprise of p sub-events, wherein p is an integer equal or greater than two; (h) a step to specify an event to be triggered by a timer or timing signal; (i) a step to structure the programming specifications into at least two fields, wherein the first field specifies the characteristics of one or more states, and the second field specifies one or more events/sub-events; (j) a step to organize at least a part of the data specified by said steps into a table format; (k) wherein said states and events are not necessary to be listed in sequential relationship to each other; (l) a step to label part of a table format program for specifying the power up default condition of said user programmable toy system; and wherein said improved Easy Format software is further configured to support at least one of the following additional characteristics (1) to (3): (1) wherein said transducer is a sound transducer, and said improved Easy Format software is further configured to handle communication with an external resource remote or separated from said programmable toy set, and to fetch data representing one or more sound files obtained from said external resource and for said microcontroller to process said data and generate a sound with said sound transducer; (2) wherein said user programmable toy set comprises a master toy member and two or more accessory toy members; wherein each accessory toy member comprises an element for said master toy member to identify an accessory toy member; said software program is further configured to enable said user program to direct said microcontroller to provide a response when a predefined accessory toy member is identified; and (3) wherein said user programmable toy set further comprising a real time clock generator, wherein said user program allows said user to define a specific time of a day and to direct said microcontroller to provide a response when the time of said real time clock matches with the specific time defined by said user; and wherein any of said additional characteristics are compatible with said configuration states and/or events format for a user of said programmable toy system to compose an improved Easy Format program; and wherein said improved Easy Format software is further configured to compile or translate a user composed program having any of said characteristics into codes executable by said microcontroller.

U.S. Pat. No. 6,246,927 has disclosed a method of managing a plurality of controllable objects in the storage and execution of instructions related to a performance of n desired actions, the method comprising the steps of: (a) advising said plurality of objects that a first selected object is about to store instructions related to a performance of a first desired action; (b) storing, in said first object, said instructions related to said performance of said first desired action; (c) advising said plurality of objects that said storing of said instructions in said first selected object has been completed; (d) preparing said plurality of objects to receive instructions related to a performance of a next desired action; (e) storing, in a next selected object, said instructions related to said performance of said next desired action; (f) advising said plurality of objects that said storing of said instructions in said next selected object has been completed; and (g) repeating steps (d) through (f) until instructions related to said performance of said n desired actions have been stored. Additionally, U.S. Pat. No. 6,246,927 has disclosed is a system claim based essentially of same steps as mentioned above.

U.S. Pat. No. 6,246,927 has also disclosed a programmable object capable of intercommunicating with other programmable objects to perform a series of desired actions, comprising: transmitting means for transmitting signals to be received by said other objects; receiving means for receiving signals transmitted by said other objects; storage means for storing a set of instructions related to a performance by said object of a desired action of said series of desired actions; assigning means for assigning a unique event code to each set of instructions stored so that each desired action is represented by said assigned event code, said event code being stored in said storage means; tracking means, in communication with said assigning means, for tracking said unique event code so as to permit said object to track which desired action of said series of desired actions is stored in said object; commencement means, in communication with said transmitting means, for causing said transmitting means to transmit a first advisory signal indicative of the commencement of the storing of said event-coded instruction set in said storage means and to transmit a second advisory signal indicative of the completion of the storing of said event-coded set of instructions; interpreting means, in communication with said receiving means, said assignment means and said tracking means, for interpreting advisory signals received by said receiving means so as to permit said object to track whether said other objects have stored another event-coded set of instructions and to track what event codes have been assigned to those other objects, so that said assignment means can determine a next available event code for assignment; executing means for executing said event-coded set of instructions; and playback means, in communication with said transmitting means, for causing said transmitting means to transmit a playback signal, said playback signal causing said object and said other objects receiving said playback signal to execute all stored event-coded sets of instructions in event-coded order, so as to cause the performance of all desired actions in said series of actions.

Still further U.S. Pat. No. 6,246,927 has disclosed a method of and system of controlling a plurality of controllable, spontaneously programmable toys in the storage and execution of user input instructions related to a performance of a series of n desired actions, which is essentially intended to execute the steps recited the method comprising the steps recited above on the method of managing a plurality of controllable objects in the storage and execution of instructions related to a performance of n desired actions.

Further U.S. Pat. No. 6,246,927 has disclosed is a system for storing and performing a series of n desired actions in the order stored, comprising: a plurality of programmable objects, each object comprising: memory means for storing instructions related to a performance of a desired action of a series of n desired actions; tracking means for tracking said instructions that have been stored in said object; and performance means, in communication with said tracking means, for executing said instructions so as to perform said desired action in the order in which said instructions related to said desired action was stored in said object.

U.S. Pat. No. 6,546,436 has disclosed a programmable toy interface for controlling a toy structure having at least one electrically-powered output device adapted to communicate with a computer having a programmable toy control and an identification program, the interface comprising: a memory having an identification data portion that stores interface identification data specific to the toy structure; a toy controller that executes the toy control program; and a power supply that supplies electrical power to the controller. U.S. Pat. No. 6,546,436 also discloses a programmable toy entertainment system having above features and a first computer loaded with a control, program-development program which generates control and command signals and interface identification data and the first toy structure being electrically connected to the interface and capable of producing, in response to at least one output signal from the interface, at least one controlled electric power output. U.S. Pat. No. 6,546,436 also provides for a programmable toy interface for electrical connection with and control of a toy structure having at least one electrically-powered output device, and that is adapted to communicate with a computer having a programmable toy control and identification program, wherein the said interface comprising a radio frequency modem adapted to receive command and interface identification code signals from at least the computer and for transmitting data to at least one of the computer and a second interface; a controller in communication with the memory and the modem for executing the toy control program, and further adapted to process data stored in the memory for transmission via the modem; and a power supply that supplies electrical power to the controller and for selectively supplying electrical output power in the range of 2 to 9 volts dc to the output device.

US 20170053550 discloses an education system comprising a plurality of automation devices, a tablet computer and a data service center for programming, wherein the tablet computer is used to integrate drag and drop visual programming language and the plurality of automation devices to turn them into robotics and computer language educational tool; the data service center is used to provide data service support.

US 20170053550 further discloses that the tablet computer communicates with the plurality of automation devices via wireless communication, the data service center communicates with the tablet computer via internet; the plurality of automation devices are different toys, the data service center is a server-based data service center or a cloud-based data service center and comprises at least a server; each automation device comprises a CPU, a wireless transceiver, many actuators, many auxiliary hardwares, at least an indicator, many sensors and a IR emitter; the wireless transceiver, said many actuators, said many auxiliary hardwares, the at least an indicator, said many sensors and the IR emitter are electrically connected with the CPU; the wireless transceiver is used to receive command from the tablet computer and send sensor information to the tablet computer; the wireless transceiver is a WiFi transceiver or a Bluetooth transceiver; said many actuators are used to make movements of the automation devices and drive wheels of the automation devices; said many auxiliary hardwares are used to control the IR emitter and the at least an indicator; said many sensors are used to detect situation of the automation device and comprise a camera, an IR radar, a microphone, an ultrasound detector and a weight detector; the tablet computer comprises a software application that houses a visual programming language interpreter, a wireless transceiver and a number of translators; wherein the software application can implement a new educational function in the automation devices; different software applications are run on different tablet computers, different VPL programs can be written on different software applications; the visual programming language interpreter can support at least a computer language, a visual programming language program can be built in the tablet computer through visual-programming-language blocks; the visual programming language program can be integrated in the automation devices to trigger meaningful actions of the automation devices; the translators can map the functionalities of the visual-programming-language blocks to different automation devices in different sets of instructions; the server saves information of an educational function wherein the information comprises courses, lessons of each course, classes as instances of lessons with date, time and venue; the lessons have stencils and notes; the classes save the user's homework or assignment and teacher's grading and carry date and time data to indicate when a lesson is being held for particular users; the visual programming language program can be stored in the server and downloaded by the user; when the programs on a tablet computer is running, if the current execution statement is responsible to control an automation device to move forward, the tablet computer will then send the move forward command to the automation device immediately; the VPL programs can be designed to start execution upon a particular user event or hardware event detected by ultrasound sensor, IR received by the IR radar, a particular pattern recognized by the camera which are triggered by an automation device's sensors; each event is represented by one event block in the VPL programs. When an event is fired, the sequence of blocks stringed after corresponding event block will start to execute.

Though the above existing systems provide different capabilities none of them provide computer programming language illiterate individual the abilities to experiment with or implement technology enabled ideas or concepts that span electronic devices, cloud services, user interface components and virtual objects simultaneously. Further, by above described prior art; before executing the user specified logic on electronic devices, the logic cannot be validated using mock objects created on the computing device (e.g. tablet or computer). A mock object is a simulated object that mimics the behavior of an electronic device in controlled ways. This limits the ability of the user to test and validate the logic in absence of the electronic devices. It is desirable to have such mock objects and support for testing user specified logic.

Another drawback is that in the prior art systems, the ability of executing the user defined logic is implemented on either the electronic device or a computing device (e.g. computer, tablet). It is desirable to provide the user the choice of selecting the mode of logic execution best suited for the desired/contemporary application of the user specified logic.

Further, none of the above prior art systems, methods or objects are enabled for computer language skill illiterate users with a capability to specify their logic to be orchestrated in form of inputs, outputs, triggers and actions between one electronic device or virtual object or cloud services and at least one more electronic device or virtual object or cloud service and validate by running such a program.

SUMMARY OF THE INVENTION

This invention embodies an Orchestration Engine for providing a technical output across two or more than two programmable objects selected from the group consisting of electronic devices, virtual objects and cloud services in response to user specified logic. The orchestration engine is deployed on a mobile computer or a tablet computer or a laptop computer or a desktop computer or a wired or wireless electronic device in the system or on a server computer connected via internet. The said technical output comprises action performed in response to an event or a trigger generated by one or more electronic devices, virtual objects or cloud based services and a combination of different programming and logic constructs such as conditional statements, loops, variables. The orchestration engine is also provided with an input of the user specified logic through: (i) Visual Programming Interface, or (ii) Interpreted Programming language; and (iii) the Orchestration Engine is capable of executing the same using a communication protocol for communication between two or more of the programmable objects selected from the group electronic devices, virtual objects and cloud based services. The orchestration engine has one or more of following features: (i) the orchestration engine provides user with means for speed setting and waits for user specified time between every step in the logic allowing user to analyze the sequence of event at a human perceivable speed, (ii) the orchestration engine is capable of analyzing the logic specified by the user, compare it against a database of logic specified by other users and come up with suggestions and recommendations to the user about possible improvements to the logic. The electronic device to which the technical output is provided has one or more of following features: (a) is capable of detecting presence of other similar components in their vicinity using broadcast advertising on the wireless channel and by measuring the received signal strength of other wireless broadcasts received from neighbouring devices, (b) is equipped with an ability to sense capacitive touch, by using capacitive touch sensitive material in manufacturing of the outer shell of the electronic devices, the tool then, via the graphical user interface identifies/indicates which element the user has picked up, the Orchestration Engine then refers to the database in cloud to identify which device is kept on the screen and then displays appropriate help to the user.

The said event or a trigger generated by one or more electronic devices comprises any one or an equivalent of following listed illustrative events or triggers, without limitation: (i) when presence of another object in vicinity is sensed by a proximity sensor device, (ii) when acceleration or movement in any direction is sensed by motion sensor device, (iii) when an email is received with user specified content at user specified account, (iv) when an image on screen of a mobile or tablet or laptop or desktop computer is clicked with mouse or touched on the touchscreen by the use, (v) when variation in ambient light is sensed by the light sensor, (vi) when an object with user specified colour is sensed by the colour sensor device, (vii) when variation in ambient temperature is sensed by a temperature sensor, (viii) when variation in ambient humidity is sensed by humidity sensor, (ix) when pressure crossing a pre-configured threshold is sensed by pressure sensor, (x) when an object is sensed at a pre-configured distance by the ultrasonic or infrared distance sensor; and the like.

The said action performed in response to the events/triggers comprises, without limitations: (i) sending command/s to electronic devices or virtual objects or cloud based services, (ii) performing an action/s in response to the trigger or command.

The said Visual Programming Interface comprises any one selected from the group consisting of Block Based visual programming interface, (iv) Data Flow Based visual programming interface or Flow Chart Based visual programming interface and the like.

The said Interpreted Programming language comprises any one selected from the group consisting of a Javascript, Python, Lua, Typescript, Logo and the like.

The said communication protocol consists of any one selected from the group consisting of Wireless Communication with wireless sensors and actuators, Wired Communication with wired sensors and actuators or Local/Remote Application Programming interface Communication with virtual objects and Cloud Services.

The said programming and logic constructs comprise any one selected from the group consisting of conditional statements like if-then-else, loops, variables, mathematical operators like addition-subtraction-multiplication, comparison operators like greater than or less than, logical operators such as "AND" or "OR" etc., arrays and lists, numbers, strings, Booleans and other standard programming and logic constructs and the like.

The said action in response to the trigger or command, without limitation, comprises such as: (i) turning LED on or off in a light device, (ii) turning motor clockwise or anti-clockwise for fixed number of rotations or specified amount of time in motor device, (iii) generating notification in mobile device, (iv) rendering text or images on display device, (v) playing musical notes or songs or user recorded voice messages on the speaker device, (vi) sending email with user specified content to user specified email address, (vii) animating an image object on the screen of a mobile or tablet computer or a laptop or a desktop computer, (viii) posting a message on a social networking site with user specified content from user specified social networking handle or account.

The said wireless communication protocol is selected from the group consisting of Bluetooth Low energy or Bluetooth or WiFi or ZigBee and the like. The said wired communication protocol is selected from the group consisting of Ethernet, I2C, SPI, UART and the like.

The Local/Remote Application Programming Interface Communication protocol is selected from the group consisting of Cloud Services Application Programming interface, Local Software Application Programming interface and the like.

The Wireless Sensors and Actuators are selected from the group consisting of LED, Proximity sensor, Motion sensor, Motor, Screen, speaker, distance sensor, colour sensor, buzzer, button, knob, sound sensor, light sensor, touch sensor, pressure sensor, temperature sensor, moisture sensor, weight sensor, gas sensor, and infrared emitter, and the like.

The Wired Sensors and Actuators are selected from the group consisting of LED, Proximity sensor, Motion sensor, Motor, Screen, speaker, distance sensor, colour sensor, buzzer, button, knob, sound sensor, light sensor, touch sensor, pressure sensor, temperature sensor, moisture sensor, weight sensor, gas sensor, and infrared emitter, and the like.

The Virtual Objects are selected form the group consisting of animated image, Graphical User Interface components such as button, label, slider, image, chart, notification, and the like.

The Cloud or internet based services are selected from a group consisting of Email service, Social network service, text messaging service and data storage service and the like.

This invention is also embodied in a system of an orchestration engine for providing a technical output across two or more than two programmable objects selected from the group consisting of electronic devices, virtual objects and cloud services in response to user specified logic.

This invention is also embodied as a method of using an Orchestration Engine for obtaining a technical output across two or more than two programmable objects selected from the group consisting of electronic devices, virtual objects and cloud services in response to a computer program based on user specified logic.

The said system and method of the Orchestration Engine further comprises the technical output and an input as provided using the Virtual Programming Interface, Interpreted Programming Language and are based on the manner, and by using the communication protocol and electronic devices; providing event/s or trigger/s generated by one or more electronic devices and the action performed, provides action in response to the trigger or command as described above.

The said method of the Orchestration Engine is capable of supporting extensibility in order to expand support for similar common interaction methods to newer electronic devices via a plug-in framework by specifying the communication protocol of the new element and its capabilities in a descriptive way via a markup language, including JSON, YAML, XML and other languages of similar category.

The Orchestration Engine by itself and as provided in the system and the method of its use is provided along with a library of drag and drop Visual Programming Language steps required for providing executable computer program steps for specifying a user specified logic by a computer language illiterate person.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 provides a schematic diagram that represents the operation of the invention.

DETAILED DESCRIPTION OF THE INVENTION

FIG. 1 provides a schematic diagram that represents the operation of the invention.

In one embodiment this invention comprises a system of wireless electronic devices, wired electronic devices, virtual software defined objects and cloud based services used as building blocks for construction of variety of physical computing experiments and prototypes through user defined logic captured in the form of visual programming language or an interpreted computer programming language that generates technical effect in accordance to user specified logic orchestrated by a portable Orchestration Engine which is implemented as software on variety of computing platforms like, but not limited to, mobile platform like tablets or mobiles, a server computer in cloud over the internet, or on the wireless electronic devices in the system. Furthermore, the said logic can be executed in multiple modes of operation for example, without limitation, a system of generating technical effect as directed by user specified logic among wireless electronic devices, This invention also comprises a system of generating technical effect as directed by user specified logic among virtual objects, a system of generating technical effect as directed by user specified logic among a combination of wireless electronic devices and virtual representation of these devices; a system of generating technical effect as directed by user specified logic among a combination of wireless electronic devices and virtual objects, wired electronic devices and cloud based services. The system is inherently reconfigurable to support various combinations including plurality of same or different wireless electronic devices as physical computing building blocks and corresponding logic building blocks supported in the visual programming language or interpreted textual programming editor and other computational building blocks for the construction of logic, for example, without limitation, repeating statements e.g. loops, conditional statements e.g. if-then-else, storage of data e.g. variables and arrays and other standard computer programming constructs.

This invention comprises a system/method/process/software-enabled device for transforming a logical sequence of instructions provided to a computer as a set of written instructions in a visual programming language or an interpreted computer programming language into a computer readable software. In a further aspect of this invention, the said system is capable of generating a technical effect by executing the logic specified by the user by communicating and coordinating with various electronic sensors, actuators, virtual objects and cloud based services used in the user specified logic using wireless or wired communication channels, local or remote Application Programming Interfaces.

The user can specify execution sequence based on triggers and actions provided by plurality of electronic devices, virtual objects, cloud based services. The electronic devices include, without limitation, light sensors, proximity sensors, buttons and actuators like screen, motor, light, speaker and the like. Virtual objects include, without limitation, an animated image on screen of a mobile device, a touch enabled button or slider on screen of a mobile device or desktop platform, a virtual representation of the sensor device in form of a simulator or mock object and the like. Users can also specify triggers and actions from other software components, such as, without limitation, services running on the cloud like social networks, database services, email services and the like.

In one aspect of this invention, the logic desired by the user is captured using software tool which provides a visual programming interface. The said software tool can be installed or used from variety of platforms. This includes, without limitation, mobile or tablet devices, desktop or laptop computers, web browsers and the like. Once the logic is specified, without limitation, such as by feeding into the computer the instruction that "when the button on button module is pressed, turn the light on light module on" or "when proximity sensor senses presence of an object, send an email to my account", or "when I touch the button icon on tablet screen, play sound of a drum on the speaker device", this invention enables the execution of such a logic triggered via the software tool. The execution of this logic is handled by an Orchestration Engine which is a software program residing on a mobile device, or running on a server in cloud or on residing one of the electronic devices in the system.

In addition to supporting workflow orchestration/co-ordination for triggers and actions supplied by electronic devices, the system also supports coordinated operation of triggers and actions on virtual objects such as, without limitation, animated images on a mobile or tablet or laptop or desktop computer device e.g. when someone touches an animated image on the mobile device touch screen, the electronic motor module should start rotating in clockwise direction. This way, virtual and electronic devices are linked to each other via user specified logic.

In one aspect of the invention, a visual programming interface, which can be operated even by a computer programming language illiterate person, is used as a tool to provide the logical sequence of instructions, which gets converted in the computer into a computer program written using a standard computer programming language such as C, Java etc. Providing a visual programming interface instead of standard computer programming interface allows even the computer programming language illiterate individual user to quickly understand how to write the desired logic in the form of instructions that the computer can understand. Examples of visual programming interface are MIT's Scratch programming language (https://scratch.mit.edu/) or Code.org (www.code.org).

Definition of Orchestration Engine:

The term "Orchestration Engine" which is also called as "central execution engine" as used in this specification, comprises a software component that enables execution of the logical sequence of instructions provided to the computer through visual programming interface or through Interpreted Programming language by parsing the specified logic and communicating to other components of the system. The other components used in this invention include, without limitation, the electronic devices such as button, display, motor, and services running on the cloud such as social networks, email servers and the like, virtual objects such as animated images, simulated representation of electronic devices, Graphical User Interface components like label, image, button etc.

While the visual programming language simplifies the process for the user to specify the desired logical sequence of instructions, the Orchestration Engine provides the ability to execute those instructions by parsing the specified logic and communicating to other components such as the electronic devices, services running on the cloud, etc. The requirement for being able to execute the logic is 2 fold 1. The software component needs to be able to parse and understand the user specified logic,
2. The software component needs to be in a position to communicate with all different devices and other software components which are used in the user specified logic.

There are multiple places where the component of the system can be located as a system component. This includes, without limitation, its installation/insertion in mobile devices including, without limitation, smart phone or tablet, embedded computing devices such as smart-watches or electronic sensor components, cloud based software, a desktop/laptop computer and the like.

The Orchestration Engine is in a position to communicate with all electronic devices used in the user specified logic via wireless or wired connectivity and with virtual objects and cloud services via local or remote Application Programming Interfaces. Every sensor component, input device, virtual object or cloud service communicates any event it sees to the Orchestration Engine. For example, every time button is clicked, button module reports it or every time some object comes near proximity sensor, the sensor communicates it to the Orchestration Engine. The Orchestration Engine, upon receipt of any event checks the logic specified by the user to see if any action needs to be taken on the received event. If so, the Orchestration Engine proceeds to communicate the necessary actions to be taken to electronic devices, virtual objects or cloud services as instructed by the user specified logic.

As the logic provided by user starts getting more complex and multiple electronic devices and virtual components are used, it becomes difficult to identify mistakes in the logic when the logic is being executed. This is because the elements can communicate much faster and execute the workflows faster than user can observe. In a further embodiment of this invention, to help the user debug incorrect behavior, the method provides a way to set the speed of the Orchestration Engine. The Orchestration Engine then waits for user specified time between every step in the logic allowing user to analyze the sequence of event at a human perceivable speed.

In a still further aspect, the method of this invention is also capable of analyzing the logic specified by the user, compare it against a database of logic specified by other users and come up with suggestions and recommendations to the user about possible improvements to the logic. The platform can also analyze the complexity of the specified logic using machine learning algorithms run on logic specified by multiple users. The data is collected in the cloud and is processed to come up with these statistics.

The wireless electronic devices in the system are capable of detecting presence of other wireless electronic devices in their vicinity using broadcast advertising on the wireless channel and by measuring the received signal strength of the wireless broadcasts received from neighboring devices. This enables the user to specify actions based on events such as, for example: "when button comes near the light emitting bulb, turn the bulb on".

The electronic devices are also equipped with an ability to sense capacitive touch. This is done by using capacitive touch sensitive material in manufacturing of the outer shell of the electronic devices. This capacitive sensing capability is similar to the touch-screen capability provided by mobile devices which allows them to sense human touch. Whenever the electronic devices come in contact with human touch, it is detected by the capacitive sensor in the electronic device which then can react to the user action in form of changing the colour of status indicator lights etc. The electronic device also reports this to the software tool running on the mobile device. The tool then, via the application on a mobile or tablet or laptop or desktop computer can indicate which element the user has picked up.

In one aspect of this invention, in order to help the user understand how to interact with various electronic devices such as a motion sensor or a proximity sensor, the software tool running on a mobile device with a touch-screen provides necessary information in the form of help text and images when an electronic device is kept on the mobile device screen, the tool can identify which electronic device user is using. This is achieved by applying a coating of capacitive material in unique shape on the enclosure of each electronic device during its manufacturing. The mapping between which capacitive shape (i.e. capacitive signature) corresponds to which electronic device is pre-decided and saved in cloud. The software component of the system running on mobile device, using the touch screen interface provided by the underlying operating system reads the capacitive signature of the device kept on the screen. It then refers to the database in cloud to identify which device is kept on the screen and then displays appropriate help to the user. For example, when an user places a light sensor on the designated area on the screen of the mobile device, the application will identify it as Light Sensor device based on the comparison between the capacitive material pattern on the outer shell of the said device and a database mapping capacitive patterns and corresponding devices. The capacitive material pattern can be sensed using the touch screen capabilities of the operating system and show in help and hints about how Light Sensor works and how one can interact with Light Sensor via a video clip or slide show and other multimedia content.

The method of this invention also supports extensibility in order to expand support for the same common interaction methods to newer electronic devices via a plug-in framework. The plug-in framework allows the platform to start supporting newer electronic devices, cloud services or virtual objects referred to as an "element" by specifying the communication protocol of the new element and its capabilities in a descriptive way via a markup language. Markup languages, without limitation include JSON, YAML, XML and the like. No additional computer programming is required in the system in order to extend it to support newer electronic devices, cloud services or virtual objects. For example, adding support for a third party robotics system requires a text file describing the capabilities of the third party robotics system and communication protocol using a markup language to be added into the plug-in framework. The plug-in framework will parse the file, analyze the contents and make changes to the user interface to provide visual programming blocks as well as interpreted language functions to interact with the newly added robotic system. The system will now allow users to send commands to the third party robotics system. Integrating such a third party robotics system does not require any application changes.

The method of this invention provides several advantages. Some of which include:

1. Teaching computer science and technology to school children.
2. Providing quick prototyping capabilities for new products e.g. validating an industrial automation workflow using smaller sensor and actuator devices to figure out possible problems before implementing large scale systems
3. Allowing people with non-technology backgrounds and no electronics and computer programming skills to also start using customizable technological workflows within their fields. Examples include, without limitation, an architect can use the sensors to simulate and demonstrate how lighting automation will work in a proposed building or a product designer can use the system to simulate and demonstrate how a proposed medical device design will operate.

Following are some examples on to illustrate working of this invention. These examples, by no means, limit the scope of this invention. A person skilled in the art would readily understand that variation of these examples. Several other and equivalent examples are possible as application of this invention; all such obvious variations and equivalents are construed to be within the scope of this invention.

EXAMPLES

Example 1

Application: An architect demonstrating proposed security system for a new Home design project where the model of the house is made to scale using cardboard or similar material and an alert is sent via email to the owner of the home Objective: When the security system is enabled and an intruder enters the house, alarm should to go off automatically to alert everyone. The home owner is alerted by sending an email alert.

Programmable objects used: Button module, Proximity sensor, Buzzer module

Arrangement of electronic devices/hardware: The security system was constructed by keeping a proximity sensor just behind the entrance door of the model house and a buzzer module in another room of the model house. A button module placed near the buzzer was used to enable or disable the system.

Instructions: A logical sequence of instructions was created in the application to represent the desired behavior of the system.

The instructions were as follows:
1. when button is clicked, enable the system
2. when object comes near proximity,
    a. if: system is enabled
        i. start the buzzer
        ii. send email to home owner
    b. else: do nothing
3. when button is double clicked, disable the system For each of the above pre-constructed instruction in visual programming language, appropriate algorithm to actuate relevant devices was fed into the relevant electronic devices.

Example 2

Application: A child demonstrating an automatic street lighting system as part of the 'smart city' theme science exhibition in their school.

Objective: The street light system should be activated when it becomes dark and there is movement in the vicinity of the street lights.

Programmable objects used: Proximity sensor, 3 Light modules, Light sensor

Arrangement of electronic components/hardware: The light modules were placed at fixed intervals attached to candy sticks erected to depict street lights along the street constructed using cardboard cutouts and painted using coloring materials. A light sensor and proximity sensor were placed near the first street light.

Instructions: A logical sequence of instructions was created in the application to represent the desired behavior of the system.

The instructions were as follows:
1. when the surrounding light changes from bright to dark, activate the system
2. when object comes near proximity,
    a. if: system is activated
        i. turn lights on in white color
        ii. turn lights off after fixed time
    b. else: do nothing
3. when the surrounding light changes from dark to bright, deactivate the system For each of the above pre-constructed instruction in visual programming language, appropriate algorithm to actuate relevant devices was fed into the relevant electronic devices.

Example 3

Application: A group of girls in an after-school robotics workshop creating a hand controlled vehicle project that includes an user interface to control the movements of the vehicle.

Objective: To operate the vehicle using the motion sensor held in the hand

Programmable objects used: Motion sensor, Motors, Graphical user interface (GUI) button components.

Arrangement of electronic components/hardware: Two motors (A and B) were joined together using elastic bands and wheels were attached to the motor shaft to create a drive platform. The motion sensor was held in the hand such that it could be tilted front or back. Two GUI button components were used to create a user interface that controlled left and right turn of the vehicle.

Instructions: A logical sequence of instructions was created in the application to represent the desired behavior of the system.

The instructions were as follows.
1. When motion sensor detects forward tilt, start rotating motor A in clockwise direction and start rotating motor B in anticlockwise direction.
2. When motion sensor detects backward tilt, stop rotating both motors.
3. When the left button is clicked on the user created GUI, stop motor A, rotate motor B in anticlockwise direction for 1 rotation and then start both the motors to move the drive platform forward.
4. When the right button is clicked on the user created GUI, stop motor B, rotate motor A in clockwise direction for 1 rotation and then start both the motors to move the drive platform forward.

For each of the above pre-constructed instruction in visual programming language, appropriate algorithm to actuate relevant devices was fed into the relevant electronic devices.

Example 4

Application: A designer in a design studio creating an auto adjusting pulley system model which is part of the new machine designed by her for the client.

Objective: To operate a pulley system that can be activated using buttons but stops automatically when it approaches ground or the pulley pivot point.

Programmable objects used: 2 Proximity sensors, Button module, Motor, Pulley (accessory), String (accessory), container to attach to string in which objects can be placed.

Arrangement of electronic components/hardware: One proximity sensor was attached just below the pulley. Another proximity sensor was attached to the bottom of the container tied to a string. The string was setup around the pulley. Pulley was attached to the motor shaft. Motor was placed on some height.

Instructions: A logical sequence of instructions was created in the application to represent the desired behavior of the system.

The instructions were as follows.
1. When button is clicked, start motor in clockwise direction so that the object attached to pulley starts descending.
2. When button is double-clicked, start motor in anticlockwise direction so that the object attached to pulley starts ascending.
3. When proximity sensor attached to the container senses something near it, stop the motor.
4. When proximity sensor attached below the pulley senses something near it, stop the motor.

For each of the above pre-constructed instruction in visual programming language, appropriate algorithm to actuate relevant devices was fed into the relevant electronic devices.

Example 5

Application: At home, a child creating a working model of an automatic boom barrier for train crossing which he has seen recently during a family road trip.

Objective: To operate a boom barrier as per the train passing by the crossing.

Programmable objects used: 2 Proximity sensors, Motor, stick to act as boom barrier (accessory)

Arrangement of electronic components/hardware: A stick acting as boom barrier was attached to the motor. The motor was placed in front of the railway crossing in the train set. Proximity sensor A was placed on the side of the boom barrier from where train approaches. Proximity sensor B was placed on the side of the boom barrier from where the train goes away.

Instructions: A logical sequence of instructions was created in the application to represent the desired behavior of the system.

The instructions were as follows.
1. When proximity sensor A senses something near it, turn the motor by in anticlockwise direction by quarter rotation so that the barrier closes.
2. When proximity sensor B senses something near it, turn the motor in clockwise direction by quarter rotation so that the barrier opens.

For each of the above pre-constructed instruction in visual programming language, appropriate algorithm to actuate relevant devices was fed into the relevant electronic devices.

Example 6

Application: A teacher in a computational thinking class creating an automated traffic light system as a practical application of the algorithm the class has learnt during the session.

Objective: To control an automated traffic light system at a Y shaped junction.

Programmable objects used: 3 Light modules

Arrangement of electronic components/hardware: 3 light modules were placed on each stem of a Y shaped junction to act as guiding traffic light for vehicles coming from that stem.

Instructions: A logical sequence of instructions was created in the application to represent the desired behavior of the system.

The instructions were as follows.
1. In a continuous loop,
2. Turn light 1 green, turn light 2 and 3 red.
3. Wait for 30 seconds
4. Turn light 1 yellow.
5. Wait for 5 seconds.
6. Turn light 2 green, turn light 1 and 3 red.
7. Wait for 30 seconds
8. Turn light 2 yellow.
9. Wait for 5 seconds.
10. Turn light 3 green, turn light 1 and 2 red.
11. Wait for 30 seconds
12. Turn light 3 yellow.
13. Wait for 5 seconds.

For each of the above pre-constructed instruction in visual programming language, appropriate algorithm to actuate relevant devices was fed into the relevant electronic devices.

Example 7

Application: Students in a computer lab in an undergraduate course creating a fan regulator system to understand the basic coding constructs of loops, variables and conditional statements.

Objective: To control a fan using a knob as a regulator

Programmable objects used: Knob module, Motor module, a fan to attach to the motor (accessory).

Arrangement of electronic components/hardware: A fan was attached to the motor shaft.

Instructions: A logical sequence of instructions was created in the application to represent the desired behavior of the system.

The instructions were as follows:
1. In a continuous loop read the knob value and store the value in a variable
2. If the knob value is zero, stop the motor
3. If the knob value is between 0 and 33 (inclusive), start rotating the motor clockwise at slow speed.
4. If the knob value is between 34 and 66 (inclusive), start rotating the motor clockwise at medium speed.
5. If the knob value is between 67 and 99 (inclusive), start rotating the motor clockwise at fast speed.

For each of the above pre-constructed instruction in visual programming language, appropriate algorithm to actuate relevant devices was fed into the relevant electronic devices.

Example 8

Application: A computer science teacher demonstrating the use of conditional statements to the class by using a button as toggling light switch.

Objective: To use a button as a state toggling light switch.

Programmable objects used: Button module, Light module

Arrangement of electronic components/hardware: No special arrangements needed.

Instructions: A logical sequence of instructions was created in the application to represent the desired behavior of the system.

The instructions were as follows:
1. When the program starts, create a state variable and set it to "off".
2. When the button is clicked, check the variable value
3. If the variable is "off", turn the light on and set the variable to "on".
4. If the variable is "on", turn the light off and set the variable to "off".

For each of the above pre-constructed instruction in visual programming language, appropriate algorithm to actuate relevant devices was fed into the relevant electronic devices.

What is claimed:

1. An Orchestration Engine for providing a technical output across two or more than two programmable objects selected from the group consisting of electronic devices, virtual objects and cloud services in response to user specified logic, wherein the orchestration engine is deployed on any one or more devices comprising a mobile computer, a tablet computer, a laptop computer, a desktop computer, a wired or wireless electronic device, or a server computer connected via the internet:
   wherein:
   a. the technical output comprises one or more actions performed in response to an event or a trigger generated by the programmable objects and based on a combination of different programming and logic constructs,
   b. the orchestration engine receives the user specified logic through:
      i. a Visual Programming Interface, or
      ii. an Interpreted Programming language, and the Orchestration Engine executes the user specified logic using a communication protocol;
   c. the orchestration engine has one or more of the following features:
      i. the orchestration engine provides the user with means for speed setting and waits for a user specified time between every step in the user specified logic to thereby allow the user to analyze a sequence of events at a human perceivable speed, ii. the orchestration engine analyzes and compares the user specified logic against a database of logic specified by other users to thereby generate and present suggestions and recommendations to the user about possible improvements to the user specified logic,
d. the programmable objects to which the technical output is provided have one or more of the following features:
   i. a capability of detecting presence of other programmable objects using broadcast advertising on a wireless channel and by measuring a received signal strength of other wireless broadcasts received from the other programmable objects, or
   ii. a capability to sense capacitive touch, by using capacitive touch sensitive material in manufacturing of an outer shell of the programmable objects, and in response to a sensed capacitive touch, notify the Orchestration Engine thereby enable the Orchestration Engine to display, via a graphical user interface which programmable object the user has touched and to display help to the user related to the touched programmable object.

2. The Orchestration Engine of claim 1 wherein:
a. the event or the trigger comprises any one of:
   i. a detection of a presence of another object in vicinity of a proximity sensor device,
   ii. a detection of acceleration or movement in any direction by a motion sensor device,
   iii. a detection of receipt of an email with user specified content at a user specified account,
   iv. a detection of a selection of an image displayed on a screen,
   v. a detection of a variation in ambient light by a light sensor,
   vi. a detection of an object with user specified color by a color sensor device,
   vii. a detection of a variation in ambient temperature by a temperature sensor,
   viii. a detection of a variation in ambient humidity by a humidity sensor,
   ix. a detection of a pressure crossing a pre-configured threshold by a pressure sensor,
   x. a detection of an object within a pre-configured distance by an ultrasonic or infrared distance sensor;
b. the one or more actions comprise:
   i. sending one or more commands to the programmable objects,
c. the Visual Programming Interface comprises any one selected from a group consisting of: a Block Based visual programming interface, a Data Flow Based visual programming interface or a Flow Chart Based visual programming interface,
d. the Interpreted Programming language comprises any one selected from a group consisting of: Javascript, Python, Lua, Typescript, or Logo,
e. the communication protocol consists of any one selected from a group consisting of: Wireless Communication with wireless sensors and actuators, Wired Communication with wired sensors and actuators or a Local or Remote Application Programming Interface Communication with virtual objects and Cloud Services,
f. the programming and logic constructs comprises any one selected from a group consisting of: conditional statements, mathematical operators, comparison operators, logical operators, arrays, lists, numbers, strings and Booleans.

3. The Orchestration Engine of claim 2 wherein the one or more actions comprise one or more of:
a. turning an LED on or off in a light device,
b. turning a motor clockwise or counterclockwise for a fixed number of rotations or a specified amount of time in a motor device,
c. generating a notification in a mobile device,
d. rendering text or images on a display device,
e. playing musical notes or songs or user recorded voice messages on a speaker device,
f. sending an email with user specified content to a user specified email address,
g. animating an image object on a screen of a mobile device, a tablet, a laptop or a desktop computer,
h. posting a message on a social networking site with user specified content from a user specified social networking handle or account.

4. The Orchestration Engine of claim 1 wherein:
a. the wireless communication protocol is selected from a group consisting of: Bluetooth Low energy, Bluetooth, WiFi or ZigBee,
b. the wired communication protocol is selected from a group consisting of: Ethernet, I2C, SPI or UART,
c. the Local or Remote Application Programming Interface Communication is selected from a group consisting of: a Cloud Services Application Programming interface or a Local Software Application Programming interface,
d. the Wireless Sensors and Actuators are selected from a group consisting of: and LED, a Proximity sensor, a Motion sensor, a Motor, a Screen, a speaker, a distance sensor, a color sensor, a buzzer, a button, a knob, a sound sensor, a light sensor, a touch sensor, a pressure sensor, a temperature sensor, a moisture sensor, a weight sensor, a gas sensor, and an infrared emitter,
e. the Wired Sensors and Actuators are selected from a group consisting of: an LED, a Proximity sensor, a Motion sensor, a Motor, a Screen, a speaker, a distance sensor, a color sensor, a buzzer, a button, a knob, a sound sensor, a light sensor, a touch sensor, a pressure sensor, a temperature sensor, a moisture sensor, a weight sensor, a gas sensor, and an infrared emitter,
f. the Virtual Objects are selected from a group consisting of: an animated image, a button, a label, a slider, an image, a chart and a notification,
g. the cloud services are selected from a group consisting of: an Email service, a Social network service, a text messaging service and a data storage service.

5. The Orchestration Engine of claim 1 wherein the Orchestration Engine is provided along with a library of drag and drop Visual Programming Language steps for providing executable computer program steps to enable a computer language illiterate person to provide the user specified logic.

6. A system to provide a technical output across two or more than two programmable objects selected from the group consisting of electronic devices, virtual objects and cloud services in response to user specified logic, the system comprising:
a computer including one or more processors, the computer being any of a mobile computer, a tablet computer, a laptop computer, a desktop computer, a wired or wireless electronic device or a server computer connected via the internet;
a user interface running on the computer to enable a user to specify logic using a Visual Programming Interface or using an Interpreted Programming Language; and an orchestration engine running on the computer to interpret, execute and monitor the user specified logic and to provide technical output across two or more than two programmable objects selected from a group consisting of electronic devices, virtual objects and cloud services and to communicate through Wireless Communication with Wireless Sensors and Actuators, or through Wired Communication with Wired Sensors and Actuators, or through local or remote API communication with Virtual Objects and Cloud Services, in accordance with the user specified logic:

wherein:
the user interface is accessed via a touch screen, a keyboard or a mouse;
the Visual Programming Interface is any one or more selected from a group consisting of: a Block Based Programming interface, a Data Flow Based Programming Interface or a Flow Chart based Programming Interface;
the Interpreted Programming Language is any one or more selected from a group consisting of: JavaScript, Python, Lua, Typescipt or Logo;
the user specified logic comprises:
programming and logic constructs selected from a group consisting of: if-then-else statements, loops variables, mathematical operators, addition-subtraction-multiplication statements, comparison operators greater than operators or less than operators, logical AND or OR operators, and
data types selected from a group consisting of: arrays, lists, numbers, strings or Booleans;
the orchestration engine provides the user with a speed setting and waits for a user specified time between every step in the user specified logic allowing the user to analyze a sequence of events at a human perceivable speed;
the orchestration engine analyzes and compares the user specified logic against a database of logic specified by other users and generates and presents suggestions and recommendations to the user about possible improvements to the user specified logic;
the technical output comprises one or more actions performed in response to an event or a trigger generated by one or more electronic devices, virtual objects or cloud based services in accordance with the user specified logic;
the wireless communication is performed using a protocol selected from a group consisting of: Bluetooth Low energy, Bluetooth, WiFi or ZigBee;
the wired communication is performed using a protocol selected from a group consisting of: Ethernet, I2C, SPI or UART;
the local or remote API Communication is performed using an interface selected from a group consisting of: a Cloud Services Application Programming interface or a Local Software Application Programming interface,
the Wireless Sensors and Actuators are selected from a group consisting of: an LED, a Proximity sensor, a Motion sensor, a Motor, a Screen, a speaker, a distance sensor, a color sensor a buzzer, a button a knob a sound sensor, a light sensor, a touch sensor, a pressure sensor, a temperature sensor, a moisture sensor, a weight sensor, a gas sensor, and an infrared emitter;
the Wired Sensors and Actuators are selected from a group consisting of: an LED, a Proximity sensor, a Motion sensor, a Motor, a Screen, a speaker, a distance sensor, a color sensor, a buzzer, a button, a knob, a sound sensor, a light sensor, a touch sensor, a pressure sensor, a temperature sensor, a moisture sensor, a weight sensor, a gas sensor, and an infrared emitter;
the Virtual Objects are selected from a group consisting of: an animated image, a button, a label, a slider, an image, a chart or a notification; and
the Cloud services are selected from a group consisting of: an Email service, a Social network service, a text messaging service and a data storage service.

7. The system of claim 6 further comprising:
a library of drag and drop Visual Programming Language steps for providing executable computer program steps to enable a language illiterate person to provide the user specified logic.

8. A method for providing a technical output across two or more than two programmable objects selected from the group consisting of electronic devices, virtual objects and cloud services in response to user specified logic comprising:
deploying an orchestration engine on a computer, the computer being any of a mobile computer, a tablet computer, a laptop computer, a desktop computer, a wired or wireless electronic device or a server computer connected via the internet;
specifying the user specified logic using a Visual Programming Interface or using an Interpreted Programming Language via a user interface running on the computer;
storing the user specified logic on the computer;
interpreting, executing and monitoring the user specified logic via an orchestration engine running on the computer;
providing technical output across two or more than two programmable objects selected from a group consisting of: electronic devices, virtual objects and cloud services, the technical output being provided by communicating through Wireless Communication with Wireless Sensors and Actuators, through Wired Communication with Wired Sensors and Actuators, or through Local or Remote API communication with Cloud Services and Virtual Objects in response to the user specified logic provided to the computer; and
providing a plug-in framework by specifying communication protocol capabilities of a new element via a markup language, the markup language including one or more of: JSON, YAML or XML to thereby support extensibility for newer electronic devices;

wherein:
the user interface is accessed via a touch screen, a keyboard or a mouse;
the Visual Programming Interface is any one or more selected from a group consisting of: a Block Based Programming Interface, a Data Flow Based Programming Interface or a Flow Chart based Programming Interface;
the Interpreted Programming Language is any one or more selected from a group consisting of: Javascript, Python, Lua, Typescript or Logo;
the user specified logic comprises:
programming and logic constructs selected from a group consisting of: if-then-else statements, loops variables, mathematical operators, addition-subtraction-multiplication statements comparison operators, greater than operators or less than operators, logical AND or OR operators, and data types selected from a group consisting of: arrays, lists, numbers, strings or Booleans;

the orchestration engine provides the user with a speed setting and waits for a user specified time between every step in the user specified logic allowing the user to analyze a sequence of events at a human perceivable speed;

the orchestration engine analyzes and compares the user specified lotic against a database of logic specified by other users and generates and presents suggestions and recommendations to the user about possible improvements to the user specified logic;

the technical output comprises one or more actions performed in response to an event or a trigger generated by one or more electronic devices, virtual objects or cloud based services in accordance with the user specified logic;

the wireless communication is performed using a protocol selected from a group consisting of: Bluetooth Low energy, Bluetooth, WiFi or ZigBee;

the wired communication is performed using a protocol selected from a group consisting of: Ethernet, I2C, SPI or UART;

the local or remote API Communication is performed using an interface selected from a group consisting of: a Cloud Services Application Programming interface or a Local Software Application Programming interface, the Wireless Sensors and Actuators are selected from a group consisting of: an LED, a Proximity sensor, a Motion sensor, a Motor, a Screen, a speaker, a distance sensor, a color sensor, a buzzer, a button a knob a sound sensor, a light sensor, a touch sensor, a pressure sensor, a temperature sensor, a moisture sensor, a weight sensor, a gas sensor, and an infrared emitter;

the Wired Sensors and Actuators are selected from a group consisting of: an LED, a Proximity sensor, a Motion sensor, a Motor, a Screen, a speaker, a distance sensor, a color sensor, a buzzer, a button, a knob, a sound sensor, a light sensor, a touch sensor, a pressure sensor, a temperature sensor, a moisture sensor, a weight sensor, a gas sensor, and an infrared emitter;

the Virtual Objects are selected from a group consisting of: an animated image, a button, a label, a slider, an image, a chart or a notification; and the Cloud services are selected from a group consisting of: an Email service, a Social network service, a text messaging service and a data storage service.

9. The method of claim 8, further comprising:

providing a library of drag and drop Visual Programming Language steps for providing executable computer program steps to enable a computer language illiterate person to provide the user specified logic.

\* \* \* \* \*